United States Patent [19]

Viens

[11] Patent Number: 4,938,151
[45] Date of Patent: Jul. 3, 1990

[54] TWIN AXLE RAIL BOGIE FOR CONVERTIBLE RAIL-HIGHWAY VEHICLES

[76] Inventor: Jacques Viens, 1486 Bellemare, Roxton Pond, Quebec, Canada, J0E 1Z0

[21] Appl. No.: 333,053

[22] Filed: Apr. 4, 1989

[30] Foreign Application Priority Data

Mar. 15, 1988 [CA] Canada ................................. 561,449

[51] Int. Cl.⁵ ........................ B61D 17/00; B62D 53/00
[52] U.S. Cl. ................................. 105/4.3; 105/182.1; 280/408; 410/53
[58] Field of Search ........................... 105/3, 4.1–4.3, 105/182.1, 215.2, 159; 410/53; 213/4, 5, 62 R, 72; 280/408

[56] References Cited

U.S. PATENT DOCUMENTS

| | | | |
|---|---|---|---|
| 2,036,535 | 4/1936 | Nelson | 105/4.1 X |
| 4,274,776 | 6/1981 | Paton et al. | 105/199.3 X |
| 4,416,571 | 11/1983 | Krause | 105/159 X |
| 4,547,107 | 10/1985 | Krause | 410/58 |
| 4,669,391 | 6/1987 | Wicks et al. | 105/4.3 |
| 4,685,399 | 8/1987 | Baker | 105/4.1 |
| 4,766,818 | 8/1988 | Wicks et al. | 105/4.3 |
| 4,773,335 | 9/1988 | Smith et al. | 105/4.3 |

OTHER PUBLICATIONS

"Italians join the intermodal race", Gazette International, Sep. 1987.
"Return of the RoadRailer", James J. Callari, Senior Editor, Traffic Management, Sep. 1987.

Primary Examiner—Robert J. Oberleitner
Attorney, Agent, or Firm—Edwin E. Greigg

[57] ABSTRACT

A rail bogie is provided with a truck having a platform and railroad wheels beneath it for riding on railroad tracks; a first fifth wheel being mounted on the platform. A draw-bar, also mounted on the platform, includes a vertical leg and a horizontal foot on which are provided a lift plate, a further fifth wheel on the lift plate and a lift mechanism capable of moving the lift plate vertically relative to a connection block located at the upper end of the leg. The bogie is for use in combination with a road vehicle provided, at its rear end, with a hooking block in contact with the vertical leg of the draw-bar; the hooking block being formed with a socket into which is received the connection block of the rail bogie for vertical displacement when the lift plate is moved by the aforesaid lift mechanism. Projecting from the lower end of the hooking block is a coupling king pin lockingly engaged in the fifth wheel of the lift plate.

17 Claims, 5 Drawing Sheets

TWIN AXLE RAIL BOGIE FOR CONVERTIBLE RAIL-HIGHWAY VEHICLES

BACKGROUND OF THE INVENTION

1. Field of the invention

The present invention relates to rail bogies adapted for connecting semi-trailers and the like road vehicles together into trains for riding on railroad tracks.

2. Description of the prior art

Rail bogies, known in the trade as "RoadRailers", have fallen into near oblivion in the 1950s and have operated in relative obscurity until recently. But, they have since then been updated and are now knowing a strong revival, possibly due to less stringent regulations from transport authorities and, perhaps more so, due to a more aggressive marketing approach from the railway industry, desiring to recapture traffic lost long ago to highway carriers such as semi-trailers.

A brief history of a new rail bogie of this type is given in the September 1987 issue of Gazette International (page 605). It is a twin-axle bogie provided with a locking mechanism for joining the bogie and a semitrailer together. At the rail transfer site, the semitrailer is moved on the track and its body lifted by its own pneumatic suspension to allow the rail bogie to be rolled beneath the trailer body which is then lowered into position on the rail bogie, the trailer wheels being thereafter lifted further to clear the tracks safely. The back of the semi-trailer is also provided with a special coupler so that a trail of semi-trailers can be formed by having the back end of one trailer fitted to the rail bogie, in the manner aforesaid, and the front end of the next trailer hooked to the coupler at the back end of the preceding trailer. The coupling is efficient but the hooking procedure is time consuming and complex.

Another type of "RoadRailer" is described in the September 1987 issue of the magazine Traffic Management. In this case, the rail bogie is secured to the body of the trailer, between each pair of tire wheels. Once the trailer is moved on the railway track, the bogie is lowered to raise the trailer wheels sufficiently to clear the track safely. Several trailers may be end connected together to form a train. In this case, all trailers are equipped permanently with rails bogies which is an expensive method of road-rail transportation.

SUMMARY OF THE INVENTION

An object of the present invention is to provide a rail bogie that can join semi-trailers together end-to-end in an easy and simple procedure, particularly using its own lifting power rather than using that of one of the semi-trailer to be connected. Also, the rail bogie of the invention is a unit independent of the semitrailer, which renders road-rail transportation less expensive.

More specifically, the invention provides a rail bogie including a truck having a platform and a railroad wheel assembly beneath the platform for riding on railroad tracks, a first fifth wheel being mounted on the platform. A draw-bar is connected at one end of the platform which draw-bar includes a vertical leg and a horizontal foot on which are provided a lift plate, having a fifth wheel of its own, and a lifting assembly capable of moving the lift plate and its fifth wheel vertically relative to a connection block located at the upper end of the draw-bar leg and between a low release position of the connecting block and a high locking position thereof.

The invention also lies in the provision of a rail bogie, as broadly described above, and of a road vehicle provided, at its rear end, with a hooking block in contact with the vertical leg of the draw-bar; the hooking block being formed with a socket into which is received the connection block of the rail bogie. The socket and the connection block are sized and shaped to allow vertical displacement of the hooking block and its socket, with respect to the connection block, when the lift plate is moved by the lifting assembly. For this purpose, projecting from the lower end of the hooking block, there is provided a coupling king pin which lockingly engages in the fifth wheel of the lift plate, thereby allowing vertical displacement of the rear end of the vehicle body when the lift plate is moved. Other features and advantages of the invention will become apparent from the description that follows of a preferred embodiment having reference to the appended drawings.

IN THE DRAWINGS

DESCRIPTION OF THE PREFERRED EMBODIMENT

Figure 1:
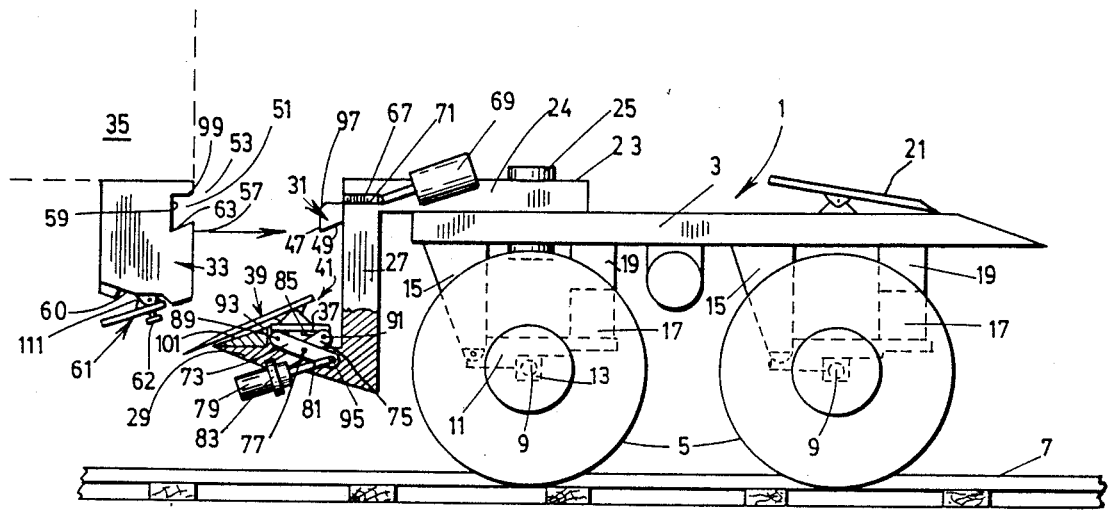
FIG. 1 is a diagrammatic side elevation view, partly in cross section, of a rail bogie made according to the invention and of the rear end of a road vehicle about to be coupled with the rail bogie.

FIG. 1 shows a rail bogie comprising a truck having a platform 3 mounted on two sets of coaxial wheels 5 for riding on railroad tracks 7. Wheel mounting is conventional and may be of the type shown comprising an axle 9 for each pair of wheels and a pneumatic suspension, for each wheel, made up of a trailing beam 11 fixed, at its center, on a support 13 pivotally mounted on the axle 9 and having one end pivoted at the lower end of a strut 15 depending from the platform 3. The other end of the beam 11 is applied against a compressed air balloon 17 supported by another strut 19 also depending from the platform 3.

The platform 3 is provided, at its rear end, with a known first fifth wheel 21 and with a draw-bar 23 at its front end. The latter draw-bar has a horizontal arm section 24 mounted on the platform 3 by means of a pivot 25 allowing it to swing laterally about a vertical axis. The draw-bar further has a vertical leg 27 solid with the arm section 24 and a horizontal foot 29 solid with the leg 27. Also solid with the leg 27, at its upper end, is a connection block 31 intended to lock into a hooking block 33 provided at the rear end and below the body of a road vehicle 35 to be hitched to the truck 1, as is further described hereinbelow.

Figure 3A:
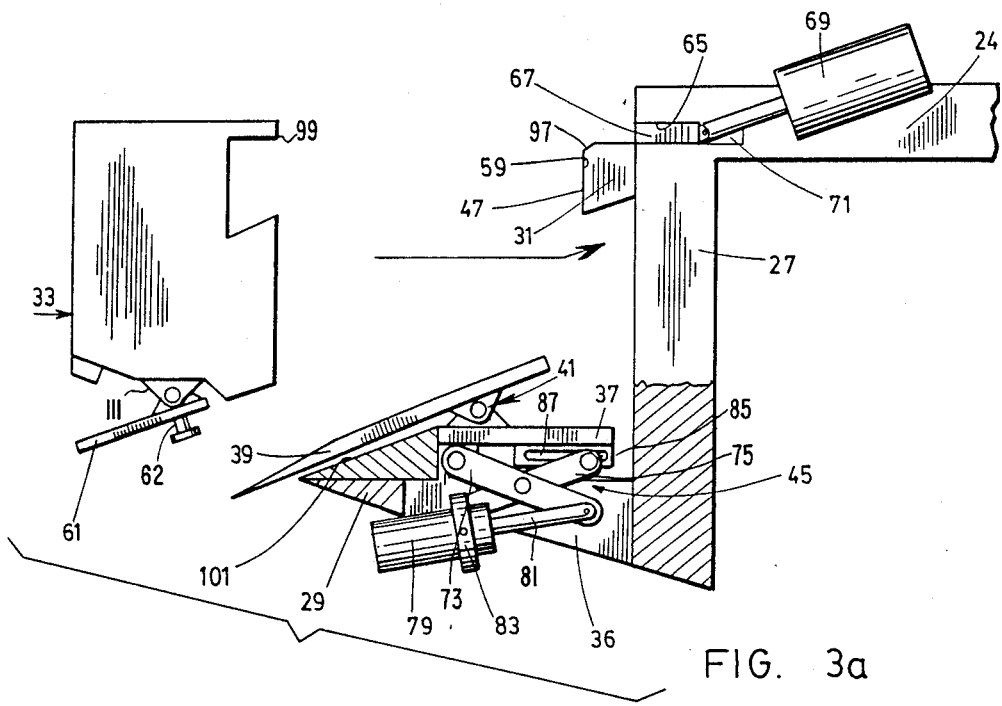
FIGS. 3a and 3b are side elevation views of the rear end of the road vehicle and the front end of rail bogie before and after coupling, respectively.
Figure 3B:
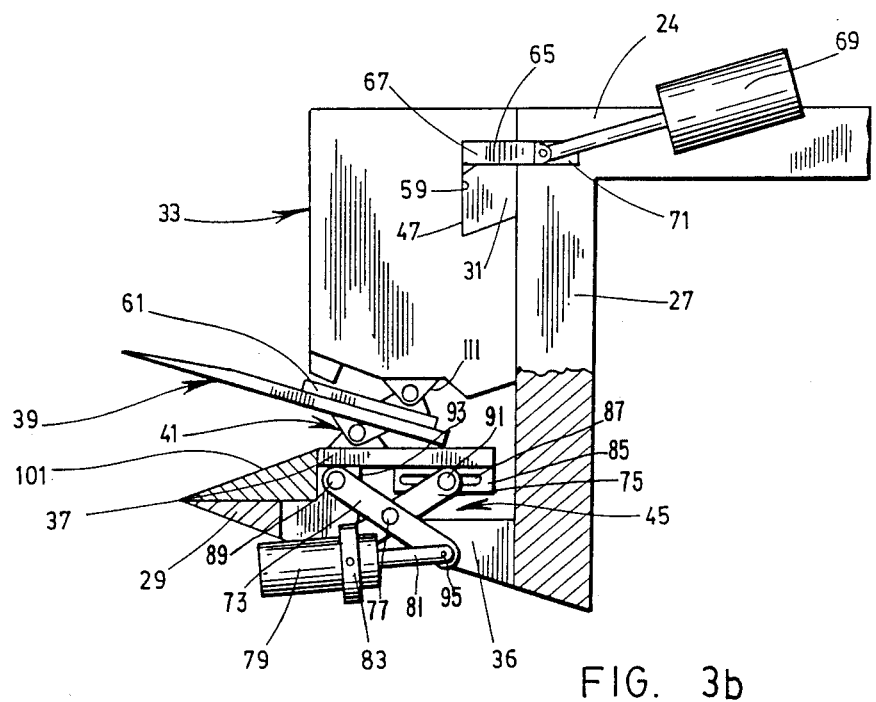

Located across an aperture 36 of the foot 29 is a lift plate 37 over which is mounted a second fifth wheel 39 made capable of oscillating about an axis transverse to the truck 1 by means of two pairs 41, 43, of cooperating pivot brackets. The lift plate 37 is movable vertically between a low release position (FIGS. 1 and 3a) of the connection block 31 with the hooking block 33, in a manner to be described hereinafter, and a high interlocking position (FIG. 3b) of the blocks 31, 33, by means of a lifting assembly 45.

Figure 2:
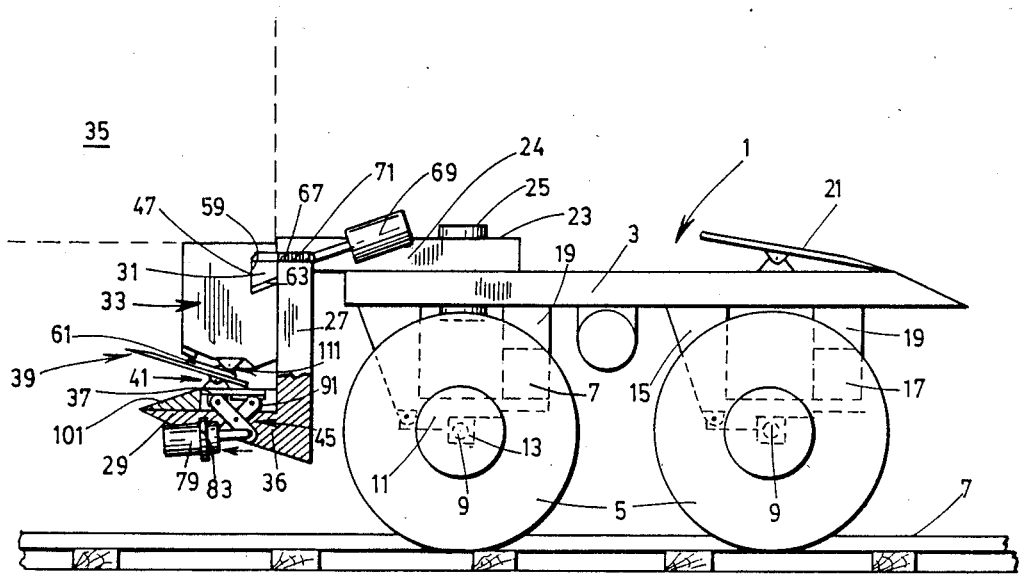
FIG. 2 is a diagrammatic side elevation view similar to FIG. 1 where the road vehicle is being partially coupled with the rail bogie.

As shown, the connection block 31 has a vertical outer wall 47 and an upwardly inclined bottom wall 49 facing the second fifth wheel 39. It is configured and sized to fit in a socket 51 formed in the hooking block 33 and having an inlet opening 53 falling in the plane of the vertical wall 57. As illustrated in FIGS. 2 and 3, the height of the outer wall 47 of the connection block 31 is smaller than that of the inward wall 59 of the socket 51 of the hooking block 33 so as to allow the latter to be moved vertically with respect to the connection block 31.

Projecting down from the lower wall 60 of the hooking block 33 is a conventional coupling king pin arrangement 61 of which the pin 62 is intended to engage lockingly in the second fifth wheel 39 on the lift plate 37. In this manner, and as gathered from FIGS. 2 and 3, actuation of the lifting assembly 45 causes displacement of the hooking block 33 and of its socket 51 with respect to the connection block 31.

The socket 33 has a bottom wall 63 which is parallel to the bottom wall 49 of the block 31 so that when the block 33 is in fully raised position, as in FIG. 3, the two walls 49 and 63 firmly engage one another. In that position also, the block 31 and the socket 51 define together a latch-receiving keeper 65 (FIG. 3) above the block 31. The bottom walls 49, 63, are held in firm engagement, and the blocks 31 and 33 thus locked together by a latch 67 made horizontally displaceable by an actuating piston 69 mounted on the arm section 24 of the draw-bar 23. The latch 67 is made movable between a retracted position in a latch housing 71 and a locking position in the keeper 65. Once the latch is in the keeper, pressure in the lifting assembly 45 may be released.

When the vehicle 35 and the rail bogie are coupled, as in FIGS. 2 and 3, the fifth wheel 39 and the coupling king pin 62 are locked together; the block 33 and thus the rear end of the vehicle 35 can then be lifted by the lifting assembly 45 from the low position in FIG. 2 to the high coupling position in FIG. 3 of the blocks, that is of the rail bogie and of the semi-trailer 35. The two are positively and firmly hitched to another by the insertion of the latch 67 into the keeper 65 and may be rolled away.

The lifting assembly 45 is made up of a pair of like cross-arm devices, one at each transverse end of the lift plate 37, only one being shown in FIGS. 1, 2 and 3.

Each cross-arm device comprises a pair of cross-arms 73, 75, connected together at 77, intermediate their ends for pivotal movement about an axis transverse to the truck 1. The cross-arms are actuated by a jack having a fluid pressure cylinder 79 and a rod 81, the cylinder being pivotably mounted, by means of a collar 83, on the foot 29 for oscillation about a transverse axis. Beneath the lift plate 37, near the leg 27, there is provided a guide member 85 formed with an elongated guide slot 87. The cross-arm 75 has one end not shown pivoted to the foot 29 while its other end cooperates with the guide member 85 to ensure its displacement in the direction of the slot 87. This may be obtained by a pin 91 displaceably guided by the slot 87. As to the cross-arm 73, it has one end pivoted to a bracket 93, beneath the lift plate 37 via a pin 89, while its other end is pivotally connected to the free end of the cylinder rod 81, at 95. With such an arrangement the jack 79, 81, is able to move the cross-arms 73, 75, in scissor fashion, that is between the flattened position in FIG. 2 and the extended position in FIG. 3.

Insertion of the connection block 31 into the socket 51 may be facilitated by the provision of bevelled edges 97, 99, on the blocks 31 and 33, respectively.

To avoid damages to the second fifth wheel 39, because of its weight, a triangular resting plate 101 may be fixed over the foot 29.

Figure 4:
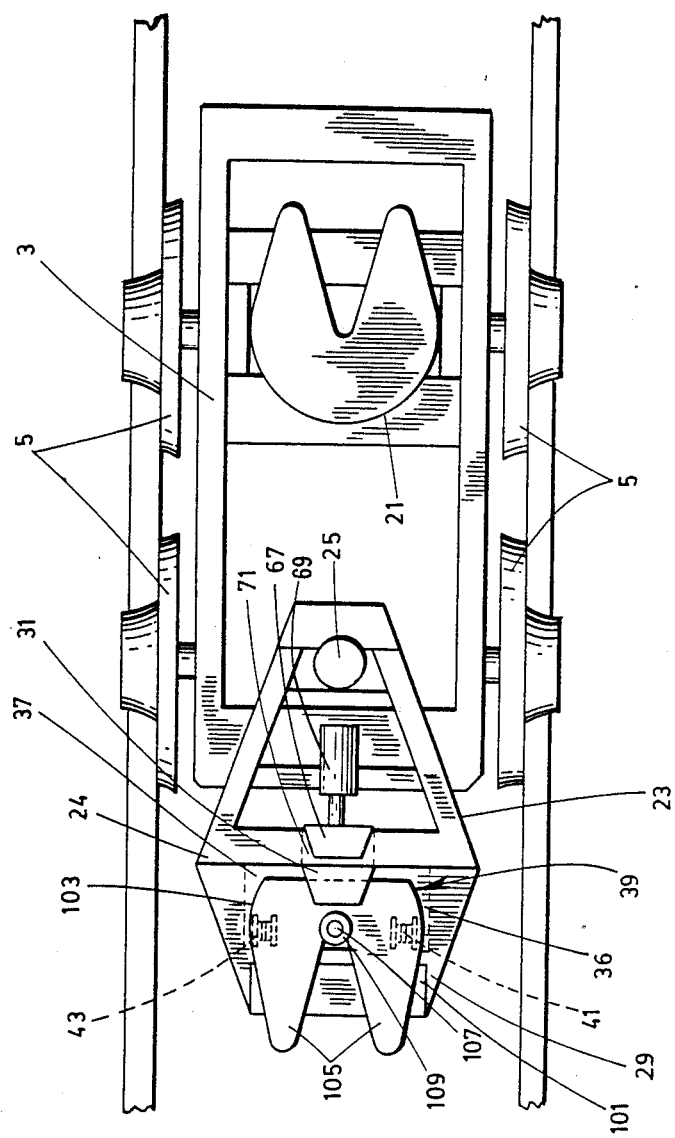
FIG. 4 is a top plan view of the rail bogie.

With reference to FIG. 4, the known second fifth wheel 39 has a generally U-shaped heavy cast-steel bed-plate 103 of which the side branches 105 form sloping ramps and define between them a V-opening leading into a central king pin aperture 107 closable by a pin lock in the form of a ring 109. The pin 62 of the coupling pin assembly 61 (FIG. 1) is received in the apertures 107 for coupling purposes. As said before, the bed-plate 103 is pivoted on the pivot brackets 41 and 43. Similarly, the coupling pin assembly 61, of FIG. 1, includes a pivot bracket mount 111 beneath the hooking block 35.

Figure 5:
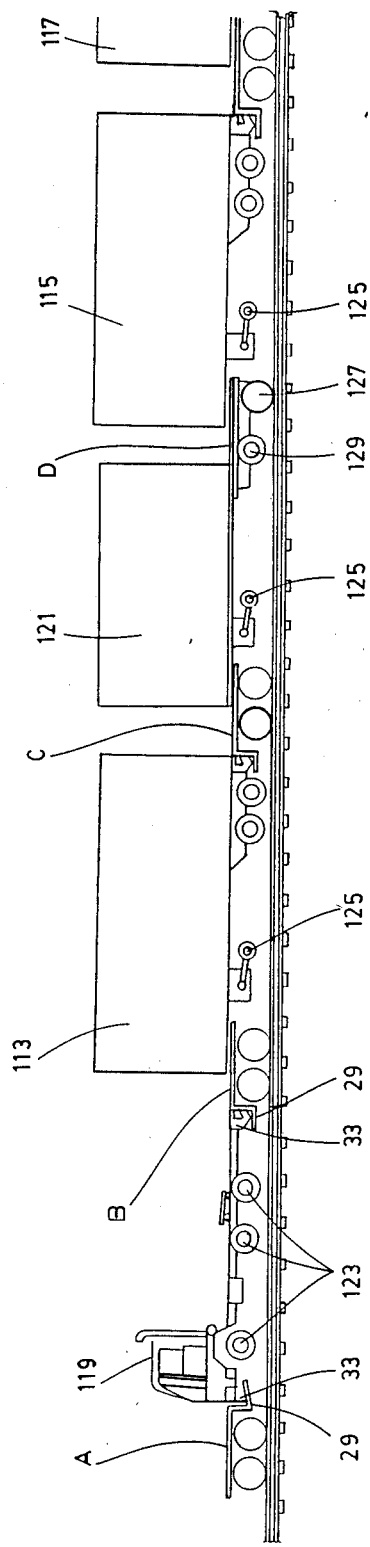
FIG. 5 is a diagrammatic side elevation view of a train of semi-trailers joined by rail bogies made according to the invention.

FIG. 5 illustrates a train formed of a combination of three semi-trailers 113, 115, 117, a road tractor 119 and a diesel engine semi-trailer 121 operable from the road tractor 119 and of which a description is given hereinbelow. In this example of use of a rail bogie made according to the invention, two such bogies A and B are moved toward the tractor 119 with their feet 29 coming under the tractor front and rear blocks 33. The semi-trailer 113 is then moved toward the bogie B and thereafter the lift assemblies 45 are actuated to raise both the tractor 119 and the front end of the semi-trailer 113 for interengagement and locking of the relevant fifth wheels and king pins and for lifting the tractor wheels 123 completely off the railroad track. At that time, the landing gear 125 of the semi-trailer 113 is retracted, as shown. Connection of the rail bogie C to the rear end of the semi-trailer 113 and the front end of the engine semi-trailer 121 is obtained in the same manner.

The next bogie D is of special construction. It has its front end permanently secured to the rear end of the engine semi-trailer 121 while its rear end has a fifth wheel interlocked with a king pin at the front end of the semitrailer 115. It is provided with a pair of railroad driving wheels 127 and a pair of road wheels 129 with pneumatic tires. Once the two semi-trailers 121, 115, are connected, through the fifth wheel, the road wheels 129 are lifted up from the railroad track. Finally, hooking of the rear end of the semitrailer 115 and the front end of the semi-trailer 117 is obtained through the rail bogie E in the same manner as described above with respect to the rail bogies A, B and C.

Figure 6:
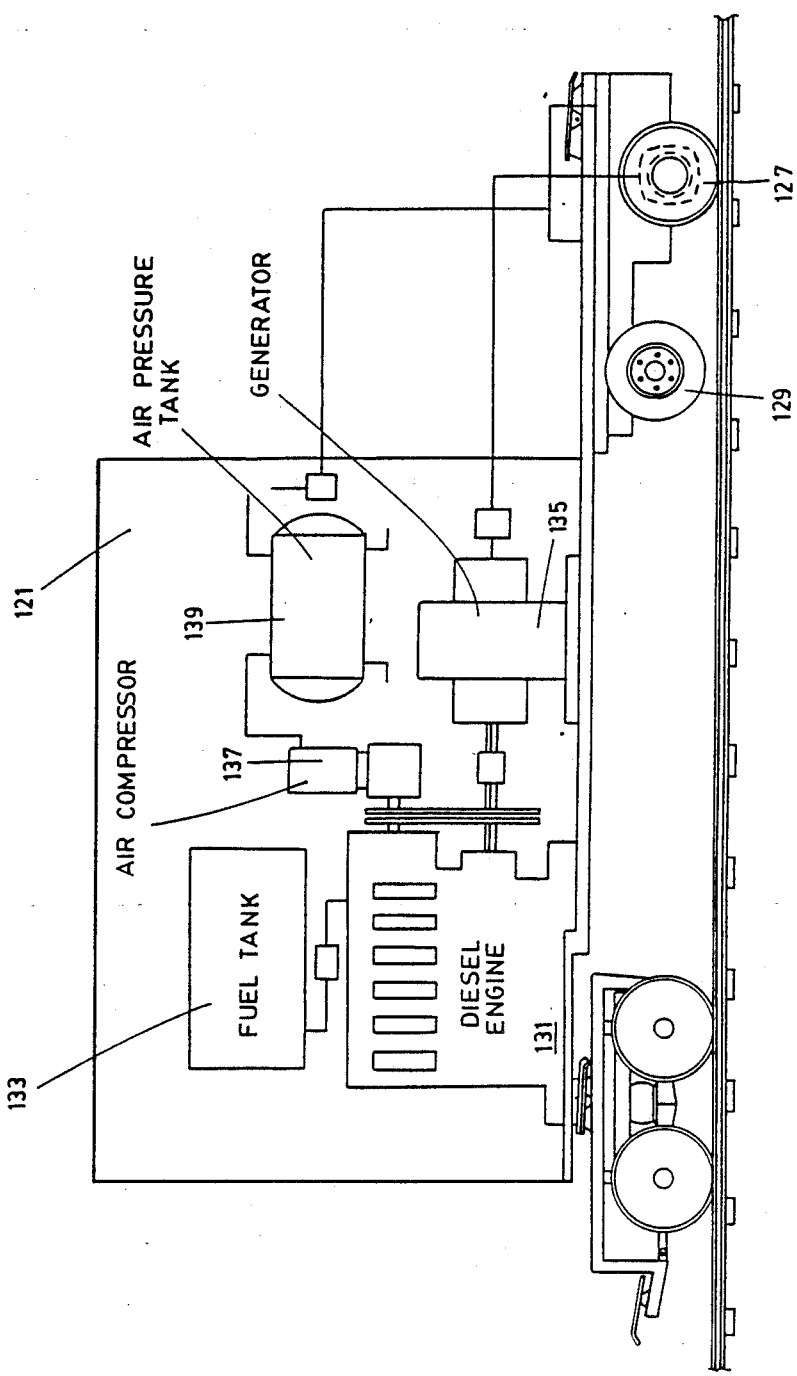
FIG. 6 is a diagrammatic side elevation view of a train drive unit or engine where the train includes a road tractor.

FIG. 6 is a diagram of the special semi-trailer 121 for driving the train, being controlled from the tractor 119 as said before. It comprises a diesel engine 131, with a fuel tank 133, operating an electric generator 135 and an air compressor 137 pressurizing air in an air tank 139, the air serving for actuating the brakes of all of the wheels 129 and 127. The latter are actuated by electric motors fed from the generator 135.

I claim:

1. A rail bogie comprising:

a truck having a platform and railroad wheel means beneath said platform allowing said bogie truck to ride on railroad tracks;

a first fifth wheel mounted on said platform;

a draw-bar mounted at one end of said platform, said draw-bar including a vertical leg and a horizontal foot solid with said leg at the lower end thereof;

a connection block solid with said leg at the upper end thereof;

a lift plate beneath said block and a second fifth wheel mounted on said lift plate; and means operatively connected to said lift plate and to said foot for moving said lift plate and said second fifth wheel thereon vertically and with respect to said connection block.

2. A rail bogie as claimed in claim 1, wherein said connection block has a vertical outer wall and a bottom wall upwardly inclined from said outer wall and facing said second fifth wheel.

3. A rail bogie as claimed in claim 2, further comprising a locking mechanism on said draw-bar, said mechanism comprising:

horizontally displaceable latch immediately above said connection block; and means for moving said latch between a locking position wherein said latch is over and substantially in contact with the upper wall of said block opposite said upwardly inclined wall and a retracted position wherein said latch is moved away from said block.

4. A rail bogie as claimed in claim 3, wherein said lift plate-moving means comprise, at each end of said lift plate transversely with respect to said truck;

two pair of cross-arms with each pair of cross-arms connected together intermediate their ends for pivotal movement about an axis transverse to said truck;

a jack having a fluid pressure cylinder and a jack rod, said cylinder being pivotally mounted, intermediate one end of each of said arms of each pair of cross-arms, for oscillation about an axis transverse to said truck;

a guide member beneath said lift plate;

wherein one arm of each pair of said two pair of cross-arms is pivoted at one end to said foot and has means, at the other end, cooperating with said guide member for guided movement of said other end in a direction lengthwise of said truck; and wherein the other arm of each pair of said two pair of cross-arms has one end pivotally mounted on said lift plate forwardly of said guide member and the other end pivotally mounted on a free end of said jack rod connected thereto.

5. A rail bogie as claimed in claim 4, wherein said guide member is formed with an elongated guide slot extending in the lengthwise direction of said truck, and wherein said cooperating means comprise pin means at the other end of said one cross-arm including a pin displaceably guided in said slot.

6. A rail bogie as claimed in claim 3, including means mounting said second fifth wheel on said lift plate for oscillation about an axis transverse to said truck.

7. A rail bogie as claimed in claim 3, wherein said draw-bar has a horizontal arm section, at its upper end, extending from said vertical leg and over said platform, and means mounting said arm section on said platform for pivotal movement about a vertical axis.

8. A rail bogie as claimed in claim 7, wherein said latch and said latch moving means are mounted on said horizontal arm section.

9. In combination, a rail bogie as claimed in claim 1 and a road vehicle, said vehicle comprising:

a vehicle body having a rear end;

a hooking block secured to said rear end and having a lower wall and a vertical wall, said vertical wall being in contact with said vertical leg of said draw-bar; said locking block being formed with a socket having an inlet opening falling in the plane of said vertical wall, said connection block being housed in said socket and having a height selected for allowing said hooking block to be displaced vertically with respect to said connection block;

a coupling king pin projecting down from said lower wall of said hooking block and being lookingly engaged in said second fifth wheel on said lift plate;

whereby actuation of said lift plate moving means for displacing said lift plate causes responsive displacement of said hooking block and socket formed therein with respect to said connection block.

10. A combination as claimed in claim 9, wherein said socket and said connection block have parallel bottom walls upwardly inclined toward said socket inlet opening and lookingly engaging one another when said lift plate and said second fifth wheel are in fully raised position, said connection block then defining with said socket a latch-receiving keeper above the said connection block.

11. A combination as claimed in claim 10, further comprising a locking mechanism on said draw-bar, said locking mechanism comprising:

a horizontal displaceable latch; and means for moving said latch in said keeper when said upwardly inclined bottom walls of said socket and of said connection block engage one another thereby locking said connection block into said socket.

12. A combination as claimed in claim 11, wherein said lift plate-moving means comprise, at each end of said lift plate transversely with respect to said truck;

two pair of cross-arms with each pair of cross-arms connected together intermediate their ends for pivotal movement about an axis transverse to said truck;

a jack having a fluid pressure cylinder and a jack rod, said cylinder being pivotally mounted, intermediate one end of each of said arms of each pair of cross-arms, for oscillation about an axis transverse to said truck;

a guide member beneath said lift plate;

wherein one arm of each pair of said two pair of cross-arms is pivoted at one end to said foot and has means, at the other end, cooperating with said guide member for guided movement of said other end in a direction lengthwise of said truck;

wherein the other arm of each pair of said two pair of cross-arms has one end pivotally mounted on said lift plate forwardly of said guide member and the other end pivotally mounted on a free end of said jack rod connected thereto.

13. A combination as claimed in claim 12, wherein said guide member is formed with an elongated guide slot extending in the lengthwise direction of said truck, and wherein said cooperating means comprise pin means at the other end of said one cross-arm including a pin displaceably guided in said slot.

14. A combination as claimed in claim 11, including means mounting said second fifth wheel on said lift plate for oscillation about an axis transverse to said truck.

15. A combination as claimed in claim 11, wherein said draw-bar has a horizontal arm section, at its upper end, extending from said vertical leg and over said platform, and means mounting said arm section on said platform for pivotal movement about a vertical axis.

16. A combination as claimed in claim 14, wherein said latch and said latch moving means are mounted on said horizontal arm section.

17. A combination as claimed in claim 11, wherein the vehicle body has a front end provided with another coupling king pin and wherein said combination further comprises a motorized semi-trailer having a rear bogie provided with a pair of railroad driving wheels and a pair of retractable road wheels, said rear bogie having an upper surface that projects rearwardly from the semi-trailer and is provided with a fifth wheel sized and positioned to receive and interlock said other coupling king pin of said vehicle body whereby said vehicle body is operatively connected to said motorized semi-trailer and driven by the same.

* * * * *